Patented Aug. 19, 1947

2,425,722

UNITED STATES PATENT OFFICE 2,425,722

THIOPHENE COMPOUNDS AND METHODS FOR OBTAINING THE SAME

Frederick F. Blicke, Ann Arbor, Mich., assignor to The Regents of the University of Michigan, Ann Arbor, Mich., a body corporate of Michigan No Drawing. Application August 6, 1945, Serial No. 609,335

17 Claims. (Cl. 260—293)

This invention relates to new thiophenic acids and esters and to methods for obtaining the same, said acids and esters having the general formula,

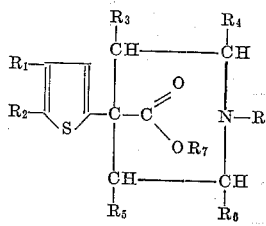

where $R_1$ represents a member of the class consisting of hydrogen and —$CH_3$, $R_2$ represents a member of the class consisting of hydrogen, chlorine, bromine, iodine, and lower alkyl radicals, $R_3$, $R_4$, $R_5$, and $R_6$ represent the same or different members of the class consisting of hydrogen and lower alkyl radicals, $R_7$ represents a member of the class consisting of hydrogen, lower alkyl and phenyl substituted lower alkyl radicals and R represents a member of the class consisting of hydrogen and lower alkyl radicals.

The thiophene compounds of the present invention because of their polyfunctional nature are useful as intermediates for the synthesis of a number of different types of organic compounds. These new compounds are also useful therapeutic agents and in general they are characterized by their high analgesic, antispasmodic and sedative effects both in humans and in animals. These compounds may be administered either in the form of their bases or in the form of their acid addition salts with organic or inorganic acids such as hydrochloric acid, hydrobromic acid, hydriodic acid, sulfuric acid, nitric acid, phosphoric acid, acetic acid, sulfamic acid, lactic acid, tartaric acid, gluconic acid, malic acid, maleic acid, benzoic acid, phthalic acid, salicylic acid, succinic acid, fumaric acid and the like acids.

The new compounds of this invention may be prepared by acid or alkaline hydrolysis of a thiophenic nitrile of the formula,

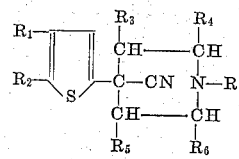

to obtain an organic carboxylic acid of the formula,

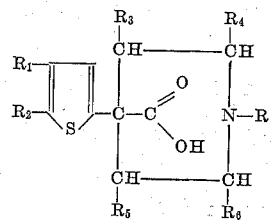

which is then converted to the corresponding acid chloride hydrochloride of the formula,

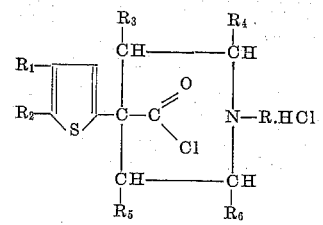

by treatment with a suitable chlorinating reagent such as thionyl chloride, phosphorus pentachloride, phosphorus trichloride or phosphorus pentachloride-phosphorus oxychloride mixture. The acid chloride hydrochloride is then treated with an excess of organic alcohol of the formula, $$R_7OH$$

whereby the desired ester of the general formula,

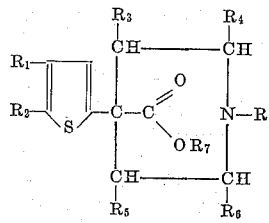

is obtained. In the above formulae $R_1$ represents a number of the class consisting of hydrogen and —$CH_3$, $R_2$ represents a member of the class consisting of hydrogen, chlorine, bromine, iodine and lower alkyl radicals, $R_3$, $R_4$, $R_5$, and $R_6$ represent the same or different members of the class consisting of hydrogen and lower alkyl radicals, $R_7$ represents a member of the class consisting of lower alkyl radicals and phenyl substituted lower alkyl radicals and R represents a member of the class consisting of hydrogen and lower alkyl radicals.

The thiophenic nitriles used as starting materials may be hydrolyzed to the corresponding carboxylic acids by either strongly basic or strongly acidic reagents or catalysts. Some examples of suitable basic reagents for effecting this conversion are alkali and alkaline earth metal hydroxides, oxides and alcoholates. Suitable acidic reagents or catalysts are, in general, mineral acids such as hydrochloric, hydrobromic, sulfuric, phosphoric and the like acids. This hydrolysis reaction may be carried out in a number of different solvents containing water. Some of the solvents which I may use for this purpose are water, aqueous methanol, aqueous ethanol, aqueous dioxane, aqueous ethylene glycol and the like.

I have found that the conversion of the above thiophenic carboxylic acids to the corresponding acyl chloride hydrochlorides may be conveniently carried out in an inert organic solvent such as chloroform, benzene, toluene, xylene, petroleum ether and the like. I have also found that an excess of the chlorinating reagent may be used as the solvent for the reaction, although when using phosphorus pentachloride it is preferable to use phosphorus oxychloride for the solvent.

The reaction of the acyl chloride hydrochloride with the organic alcohol, R7OH, may be carried out in a dry inert organic solvent such as benzene, toluene, xylene, petroleum ether, chloroform and the like but I prefer to carry out this reaction using an excess of the organic alcohol, R7OH, as the solvent.

Another method of obtaining the esters of this invention involves the reaction of a diazoalkane of the formula, $$(R_7)N_2$$

where R7 contains the group —CH= bound to the nitrogen atoms, with a thiophenic acid (obtained by the hydrolysis of the corresponding nitrile as described above) of the formula,

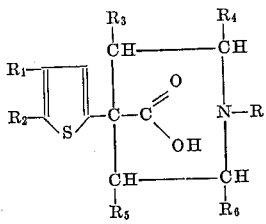

in a dry inert organic solvent, preferably in the corresponding R7OH alcohol whereby the desired thiophenic ester of the formula,

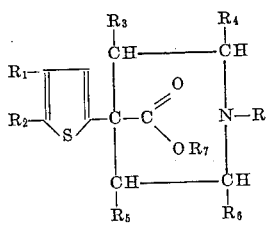

is obtained and where the R groups all have the same significance as given above.

The thiophenic nitriles used as starting materials for the preparation of the new compounds of the present invention may be prepared for example, as described in my co-pending application, Serial No. 609,334, filed August 6, 1945.

The invention is illustrated by the following examples:

*Example 1.—Methyl ester of 2-[4'-(1'-methyl-4'-carboxy-piperidyl)]-thiophene hydrochloride*

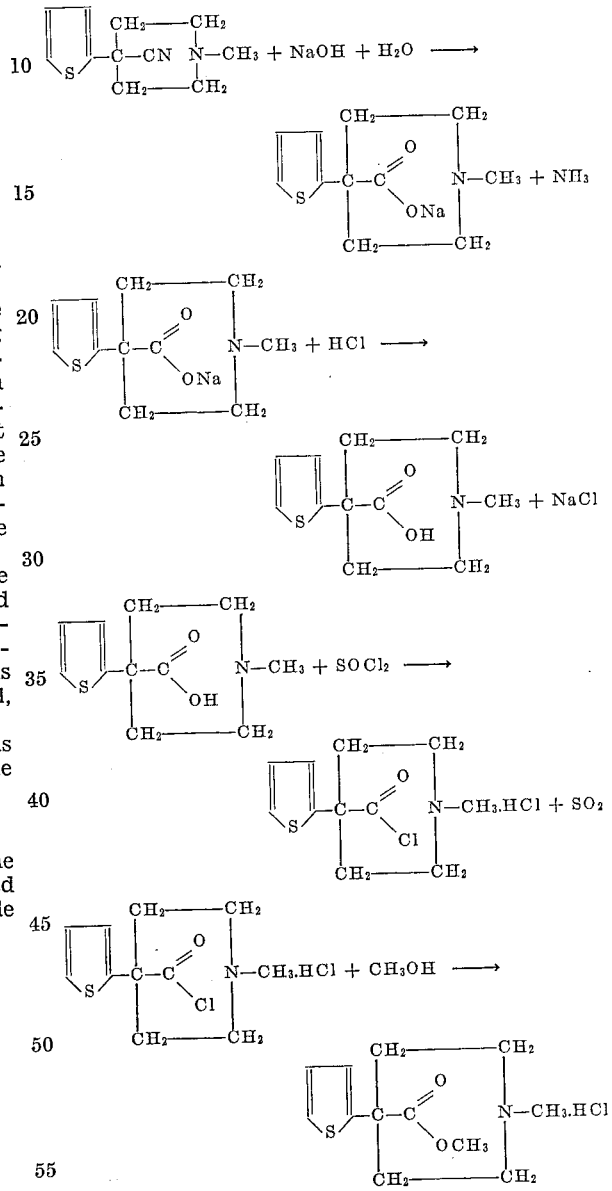

A mixture consisting of 27.4 g. (0.13 mole) of 2-[4'-(1'-methyl-4'-cyanopiperidyl)] thiophene (prepared, for example, as described in Example 1 of my copending application Serial No. 609,334, filed August 6, 1945), 26.6 g. (0.67 mole) of sodium hydroxide and 250 ml. of water is refluxed for twenty hours. The mixture is cooled and extracted with ether to remove a small amount of oil which remains. The extract is discarded and the aqueous solution treated with 6 N hydrochloric acid until precipitation of the crude 2-[4'-(1'-methyl-4'-carboxypiperidyl)] thiophene is complete. The crude product is removed by filtration, washed with water and dried. This crude product is not totally free from sodium chloride but it is sufficiently pure to be used in the preparation of the acid chloride hydrochloride. However, if the pure acid is desired it may be obtained by recrystallization of the crude acid from water. The pure acid melts with decomposition at 305-7° C.

15 g. of crude finely powdered 2-[4'-(1'-methyl-4'-carboxypiperidyl)] thiophene, prepared as described above, is suspended in 100 ml. of dry benzene and a solution of 25 ml. of pure thionyl chloride in 25 ml. of benzene added dropwise with stirring to the suspension. The mixture is refluxed on a steam bath for one-half hour and then the benzene and excess thionyl chloride distilled off under reduced pressure. 50 ml. of benzene is added to the residue and the benzene distilled under reduced pressure in order to eliminate traces of thionyl chloride. The residue, the desired acid chloride hydrochloride, is a light tan colored powder which is not particularly hygroscopic. This crude product when prepared from the crude acid still contains some sodium chloride but it is sufficiently pure for conversion to the esters. The crude product may be purified by recrystallization if the pure acid chloride hydrochloride is desired. However if the pure acid chloride hydrochloride is desired it is preferable to start with the pure acid as the final product so obtained is substantially pure and it requires little or no further purification.

A mixture consisting of 20 g. of the crude acid chloride hydrochloride of 2-[4'-(1'-methyl-4'-carboxypiperidyl)] thiophene prepared as described above, and 100 ml. of dry methanol is heated on a steam bath for two hours, filtered and the filtrate treated with charcoal. The mixture is filtered and the methanol distilled from the filtrate under reduced pressure. The residue is covered with dry ether and rubbed which causes it to crystallize. The crude methyl ester of 2-[4'-(1'-methyl-4'-carboxypiperidyl)]-thiophene hydrochloride is purified by recrystallization from absolute ethanol-ether mixture and then from ethyl acetate; M. P. 191-2° C.

*Example 2.—Methyl ester of 2-4'(1'-methyl-4'-carboxypiperidyl)-thiophene*

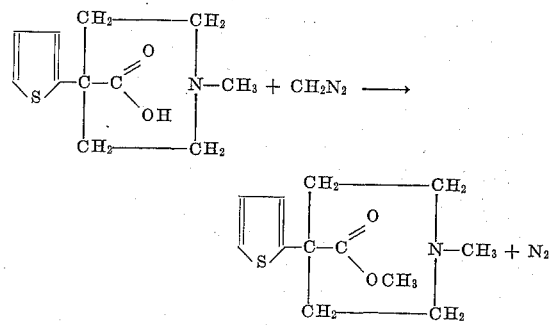

An ether solution of diazomethane is prepared from 45 g. of N-methyl-N-nitrosourea, 135 ml. of 40% aqueous sodium hydroxide and 450 ml. of ether according to the method of Arndt (Organic Synthesis, Collective volume II, p. 165) and the solution dried over sodium hydroxide in a refrigerator for three hours.

5 g. of crude finely pulverized, dry 2-[4'-(1'-methyl-4'-carboxypiperidyl)] thiophene (prepared as described in Example 1) is suspended in 200 ml. of absolute methyl alcohol and the mixture cooled in an ice bath. The suspension is shaken and the diazomethane solution added until the suspension acquires a permanent yellow color. The mixture is filtered to remove the sodium chloride which was present in the crude acid and the ether and alcohol removed by distillation. The oily residue which solidifies on standing is recrystallized from petroleum ether to yield the pure 2-[4'-(1'-methyl-4'-carboxymethyl-piperidyl)] thiophene; M. P. 75-6° C.

The hydrochloride salt of the base is prepared by treating an ether solution of the base with dry hydrogen chloride. The white crystalline hydrochloride is collected and recrystallized from absolute methanol-ether mixture; M. P. 191-2° C.

*Example 3.—Ethyl ester of 2-[4'-1'-methyl-4'-carboxypiperidyl)]-thiophene*

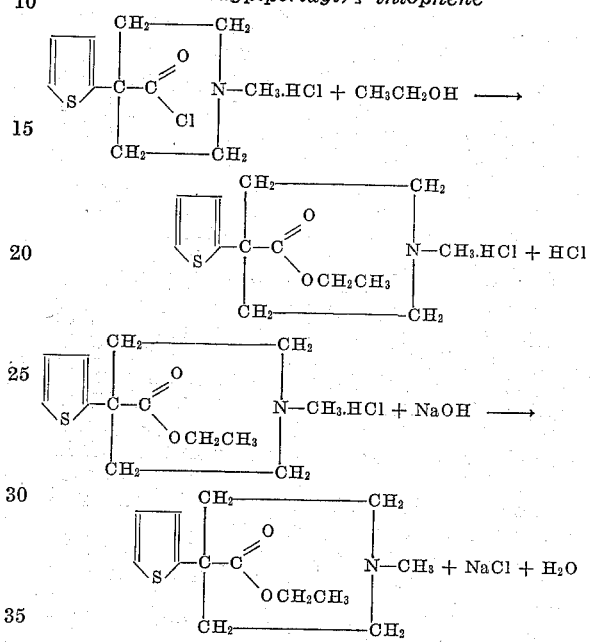

A mixture consisting of 25 g. of the crude acid chloride of 2-[4'-(1'-methyl-4'-carboxypiperidyl)] thiophene hydrochloride (prepared as described in Example 1) and 100 ml. of absolute ethanol is refluxed on a steam bath for two hours, filtered and the filtrate treated with charcoal. The mixture is filtered and the ethanol distilled from the filtrate under reduced pressure. The residue is covered with dry ether and rubbed which causes it to crystallize. The crude crystalline ethyl ester of 2-[4'-(1'-methyl-4'-carboxypiperidyl)] thiophene hydrochloride is recrystallized from absolute ethanol-ether mixture; M. P. 175-6° C.

15 g. of the hydrochloride salt is dissolved in a small amount of water and an excess of cold 5 N sodium hydroxide solution is added. The ester is extracted with ether, the ether extracts dried over magnesium sulfate and the mixture filtered. The ether is distilled and the residue distilled under a pressure of 10 mm. of mercury to obtain the free base of the pure ethyl ester of 2-[4'-(1'-methyl-4'-carboxypiperidyl)] thiophene.

*Example 4.—Ethyl ester of 2-[4'-(1'-methyl-4'-carboxypiperidyl)] thiophene hydrochloride*

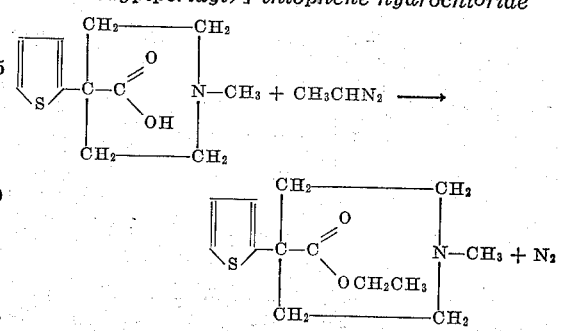

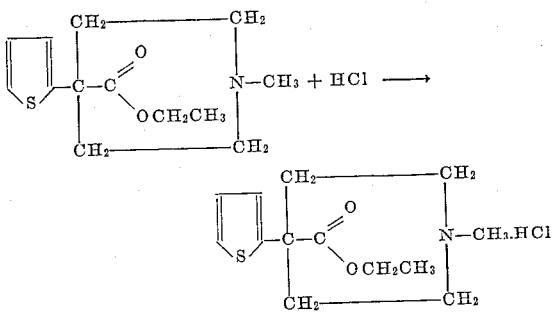

An ether solution of diazoethane is prepared from 37 g. of N-nitroso-N-ethylurea and 40% sodium hydroxide solution according to the method of Arndt for the preparation of diazomethane (Organic Synthesis, Collective vol. II, p. 165) and the solution dried over sodium hydroxide in a refrigerator for three hours.

25.2 g. of crude finely powdered 2-[4'-(1'-methyl-4'-carboxypiperidyl)] thiophene is suspended in 500 ml. of absolute ethanol and the suspension cooled in an ice bath. The diazoethane solution added slowly to the suspension with shaking and shaking continued until the mixture is colorless. The insoluble sodium chloride, present as an impurity in the starting material, is removed by filtration and the ether and alcohol distilled from the filtrate. The residue is cooled, treated with 10 ml. of concentrated ammonium hydroxide for one minute and the mixture extracted with ether. The ether extracts are washed with water and dried over magnesium sulfate. The drying agent is removed by filtration and the ether filtrate containing the free base of the ester treated with dry hydrogen chloride. The hydrochloride of the ethyl ester of 2'[4'-(1' - methyl - 4' - carboxypiperidyl)] thiophene which separates as an oil crystallizes on rubbing. The product is collected and purified by recrystallization from absolute ethanol-ether mixture; M. P. 175–6° C.

The free base of the ethyl ester of 2-[4'-(1'-methyl-4'-carboxypiperidyl)] thiophene may be obtained by distilling the ether from the above dried ether filtrate containing the free base and then distilling the residue so obtained under a pressure of about 10 mm. of mercury.

The hydrobromide salt of the ethyl ester of [2-4'-(1' - methyl - 4' - carboxypiperidyl)] thiophene may be prepared by treating the dry ether solution of the base with hydrogen bromide instead of with hydrogen chloride as described above. The crystalline hydrobromide which separates is collected and purified by recrystallization from absolute ethanol-ether mixture.

*Example 5.—n-Butyl ester of 2-[4'-(1'-methyl-4'-carboxypiperidyl)] thiophene hydrochloride*

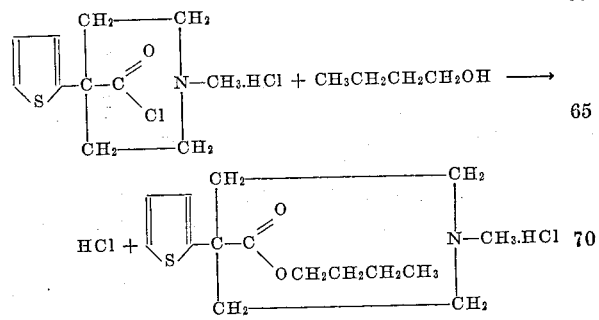

A mixture consisting of 6.5 g. of the crude acid chloride of 2-[4'-(1'-methyl-4'-carboxypiperi-dyl)] thiophene hydrochloride (prepared as described in Example 1) and 25 ml. of n-butanol is heated on a steam bath for two hours. The hot mixture is filtered, the filtrate treated with charcoal, filtered and the butanol removed under reduced pressure. The crude butyl ester of 2-[4'-(1'-methyl-4'-carboxypiperidyl)]-thiophene hydrochloride which crystallizes on rubbing under dry ether is purified by recrystallization from absolute ethanol-ether mixture and finally from ethyl acetate; M. P. 148–9° C.

5 g. of the butyl ester of 2-[4'-(1'-methyl-4'-carboxypiperidyl)] thiophene hydrochloride is dissolved in 25 ml. of water and the solution treated with an excess of 5 N sodium hydroxide solution in the cold. The base is extracted with ether, the ether extract dried over magnesium sulfate and the drying agent removed by filtration. A solution of 8 g. of maleic acid in 200 ml. of dry ether is added to the filtrate and the white maleic acid salt of the butyl ester of 2-[4'-(1'-methyl-4'-carboxypiperidyl)] thiophene removed by filtration, washed with ether and dried.

*Example 6.—Ethyl ester of 2-[4'-1'-methyl-4'-carboxypiperidyl)]5-bromothiophene*

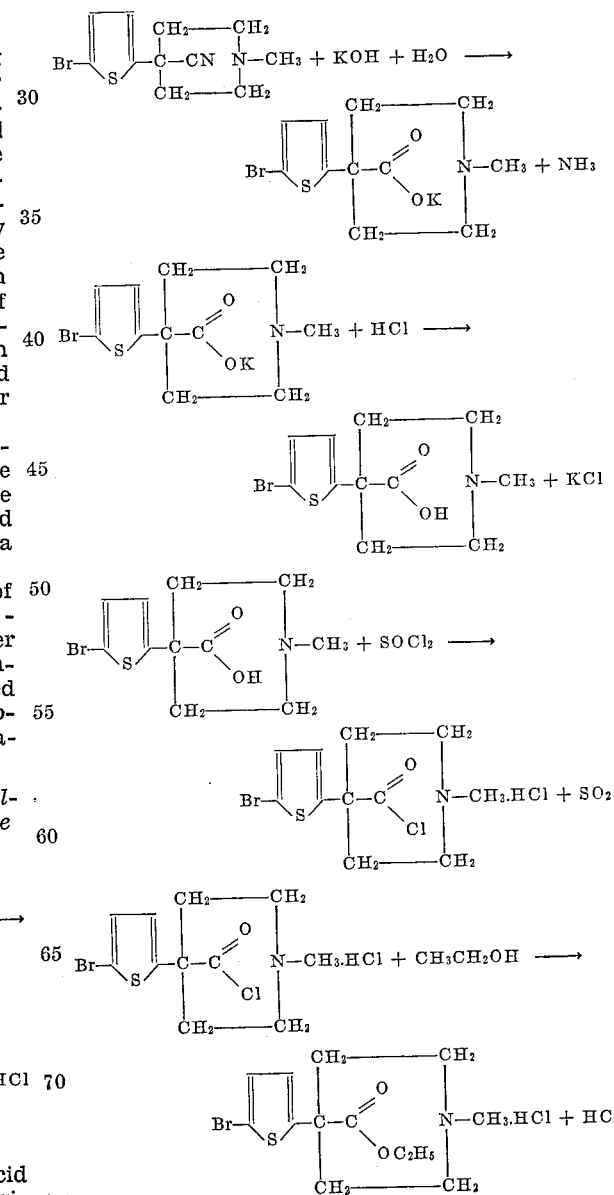

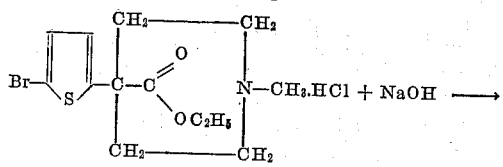

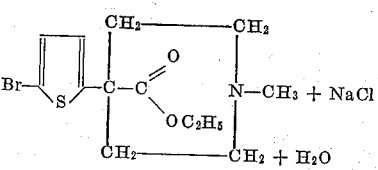

A mixture consisting of 20 g. (0.07 mole) of 2 - [4' - (1' - methyl - 4' - cyanopiperidyl)] - 5 - bromothiophene (prepared, for example, as described in Example 2 of my copending application, Serial No. 609,334, filed August 6, 1945), 19.6 g. (0.35 mole) of potassium hydroxide and 250 ml. of water is refluxed for twenty hours, cooled and the mixture extracted with 75 ml. of ether. The ether extract is discarded and the aqueous solution treated with 6 N hydrochloric acid until precipitation of the desired acid is complete. The white precipitated product is collected, washed with water and redissolved as completely as possible in 5% sodium bicarbonate solution. The mixture is filtered and the acid precipitated from the filtrate by careful addition of dilute acetic acid. The product obtained in this manner is substantially pure. If the pure 2-[4'-(1' - methyl - 4' - carboxypiperidyl)] - 5 - bromothiophene is desired it may be obtained by recrystallization of the product from water.

20 g. of pure 2-[4'-(1'-methyl-4'-carboxypiperidyl)]5-bromothiophene is added to 125 ml. of benzene and a solution of 30 ml. of thionyl chloride in 30 ml. of benzene added dropwise with cooling and stirring. After the addition has been completed, the mixture is refluxed on a steam bath for one-half hour and then the benzene and excess thionyl chloride distilled off under reduced pressure. An additional 50 ml. of benzene is added to this residue and the benzene distilled as before to remove the traces of thionyl chloride. The residue which is the desired acid chloride of 2 - [4' - (1' - methyl - 4' - carboxypiperidyl)]-5-bromothiophene hydrochloride is a yellowish-white powder.

A mixture consisting of 15 g. of the acid chloride of 2-[4'-(1'-methyl-4'-carboxypiperidyl)]-5-bromothiophene hydrochloride and 100 ml. of absolute ethanol is refluxed on a steam bath for three hours and then the alcohol removed from the reaction mixture by distillation to give the hydrochloride of the ethyl ester which may be purified if desired by recrystallization from absolute ethanol-ether mixture. The crude hydrochloride is taken up in water and the resulting solution treated with an excess of 3 N sodium hydroxide in the cold. The ester is extracted from the mixture with ether, the ether extracts dried and the ether distilled. The residue is distilled under reduced pressure to obtain the pure ethyl ester of 2-[4'-(1-methyl-4'-carboxypiperidyl)]-5-bromothiophene.

The hydroiodide salt of the base is prepared by treating an absolute ethanol solution of the base with an excess of hydrogen iodide in absolute ethanol. The salt is precipitated by the addition of dry ether, collected, washed with dry ether and recrystallized from absolute ethanol-ether mixture.

Example 7.—Methyl ester of 2-[4'-(1'-methyl-4'-carboxypiperidyl)]-4,5-dimethylthiophene

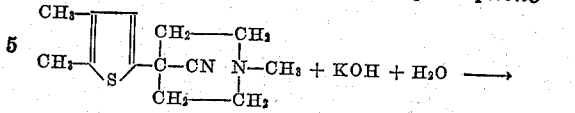

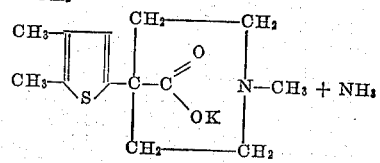

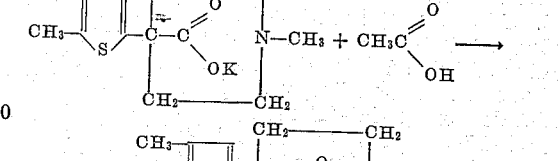

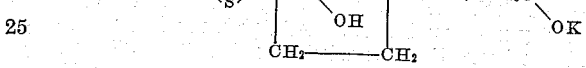

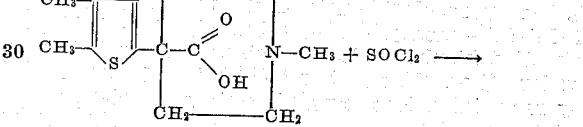

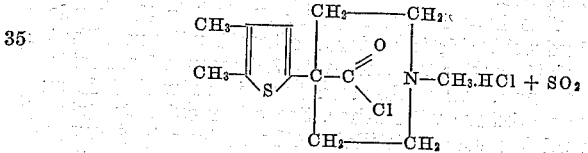

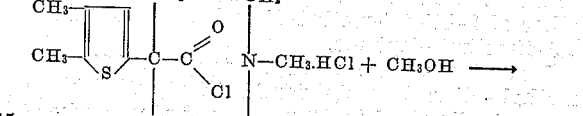

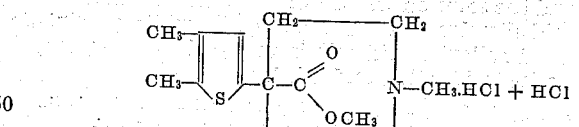

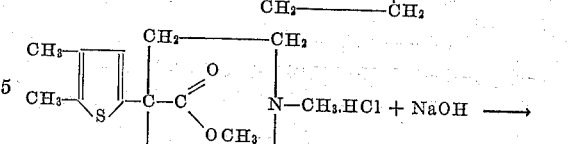

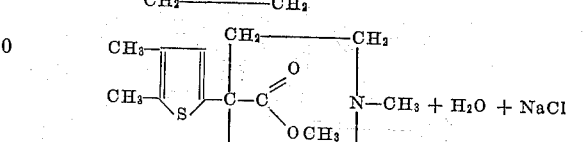

A mixture consisting of 23.4 g. (0.1 mole) of 2-[4'-(1'-methyl - 4' - cyanopiperidyl)]-4,5-dimethylthiophene (prepared, for example, as described, in Example 3 of my copending application, Serial No. 609,334, filed August 6, 1945), 25 g. (0.44 mole) of potassium hydroxide and 200 ml. of water is refluxed for twenty hours, cooled and the solution extracted with 75 ml. of ether. The ether extract is discarded and the aqueous solution treated with 50% acetic acid in the cold until precipitation of the product is complete. The crude 2-[4'-(1'-methyl-4'-carboxypiperidyl)]-4,5-dimethylthiophene is removed by filtration, washed with water and dried. The crude product is suitable for use in the next step of the process although it may be purified if desired by recrystallization from water or dilute methanol.

25 g. of crude 2-[4'-(1'-methyl-4'-carboxypiperidyl)]-4,5-dimethylthiophene is suspended in 150 ml. of benzene and the mixture cooled while a solution of 35 ml. of thionyl chloride in 35 ml. of benzene is added dropwise. The mixture is then refluxed for one-half hour on a steam bath and the benzene and excess thionyl chloride removed by distillation under reduced pressure. 100 ml. of benzene is added to the residue and distilled off under reduced pressure to remove the traces of thionyl chloride. The residue which is a light yellowish-white powder is the desired acid chloride of 2-[4'-(1'-methyl-4'-carboxypiperidyl)]-4,5-dimethyl-thiophene hydrochloride.

A mixture consisting of 20 g. of the acid chloride of 2-[4'-(1'-methyl-4'-carboxypiperidyl)]-4,5-dimethylthiophene hydrochloride and 100 ml. of dry methanol is refluxed for three hours on a steam bath, the hot solution filtered and the filtrate evaporated to dryness. The residue which is the hydrochloride salt of the methyl ester of 2-[4'-(1'-methyl-4'-carboxypiperidyl)]-4,5-dimethylthiophene is crystallized by rubbing under ether. The salt is collected and purified by recrystallization from absolute ethanol-ether mixture.

The base is liberated by dissolving the crude hydrochloride in water and treating the resultant solution with an excess of 3N sodium hydroxide solution. The liberated base is extracted from the mixture with ether, the ether extracts dried and the ether distilled. The residue is distilled under reduced pressure to yield the pure methyl ether of 2-[4'-(1'-methyl-4'-carboxypiperidyl)]-4,5-dimethylthiophene.

5 g. of the pure methyl ester of 2-[4'-(1'-methyl-4'-carboxypiperidyl)]-4,5-dimethylthiophene is dissolved in 50 ml. of anhydrous ether and the solution treated with an excess of salicylic acid dissolved in dry ether. The white precipitated salicylic acid salt is removed by filtration, washed with ether and dried.

*Example 8.—n-Propyl ester of 2-[4'-(1'-ethyl-4'-carboxypiperidyl)]-5-methylthiophene*

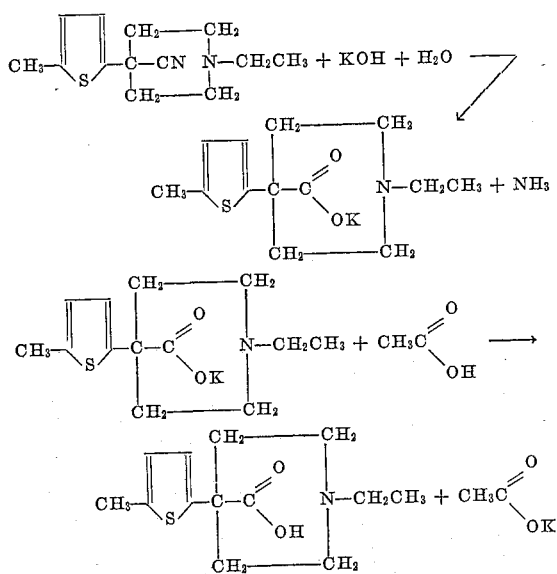

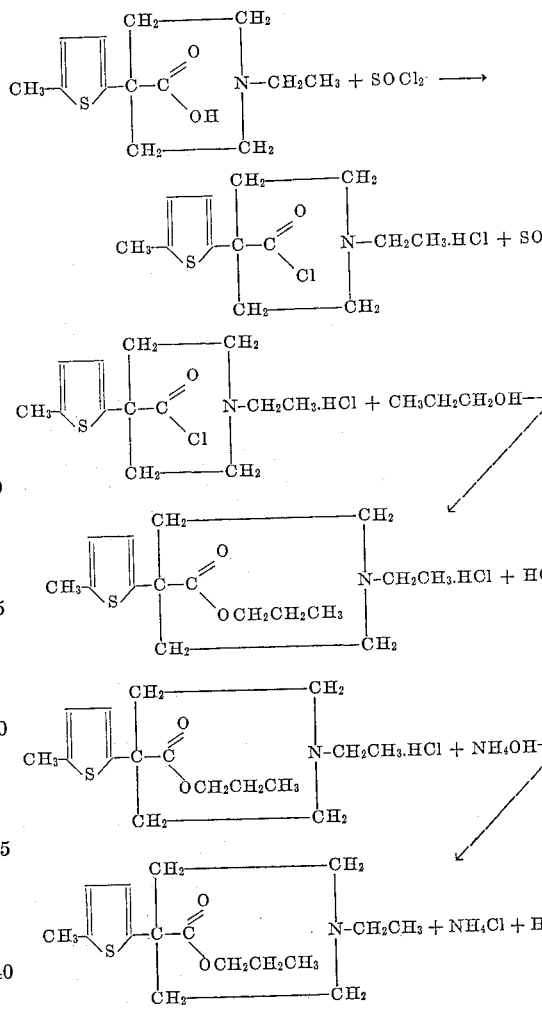

A mixture consisting of 35.1 g. (0.15 mole) of 2-[4'(1'-ethyl-4'-cyanopiperidyl)]-5-methylthiophene, (prepared, for example, as described in Example 4 of my copending application, Serial No. 609,334, filed August 6, 1945), 42 g. (0.75 mole) of potassium hydroxide and 250 ml. of water is refluxed for twenty hours, cooled and the solution extracted with 75 ml. of ether to remove any unchanged nitrile. The aqueous solution is treated with 50% acetic acid until precipitation of the thiophene carboxylic acid is complete. The white precipitated product is removed by filtration, washed with water and recrystallized from water to yield the pure white crystalline 2-[4'-(1'-ethyl-4'-carboxypiperidyl)]-5-methylthiophene.

30 g. of finely powdered 2-[4'-(1'-ethyl-4'-carboxypiperidyl)]-5-methylthiophene is suspended in 200 ml. of dry benzene and a solution of 50 ml. of pure thionyl chloride in 50 ml. of benzene added dropwise to the reaction mixture. The mixture is refluxed on a steam bath for one-half hour and then the benzene and excess thionyl chloride distilled off under reduced pressure. 100 ml. of benzene is added to the residue and the benzene distilled under reduced pressure to remove the traces of thionyl chloride from the product. The yellowish-white powdery residue is the desired acid chloride of 2-[4'-(1'-ethyl-4'-carboxypiperidyl)]-5-methylthiophene hydrochloride.

A mixture consisting of 25 g. of the acid chloride hydrochloride and 200 ml. of n-propanol is heated on a steam bath for two hours and then the propanol removed by distillation under reduced pressure. The residue which consists of practically pure n-propyl ester of 2-[4'-(1'-ethyl-4'-carboxypiperidyl)]-5-methylthiophene hydrochloride is dissolved in water, the solution made alkaline in the cold with 3 N ammonium hydroxide and the free base extracted with ether. The ether extracts are washed with water and then dried over magnesium sulfate. The drying agent is removed by filtration and the ether distilled from the filtrate. The residue which is almost pure n-propyl ester of 2-4'-(1'-ethyl-4'-carboxypiperidyl)-5-methylthiophene is distilled under reduced pressure (about 5 mm.) to yield the pure ester base.

5 g. of the pure n-propyl ester of 2-4'-(1'-ethyl-4'-carboxypiperidyl)-5-methylthiophene is dissolved in 100 ml. of dry ether and the solution treated with a slight excess of dry gaseous hydrogen bromide. The white hydrobromide salt which which separates from the solution is collected and recrystallized from absolute ethanol-ether mixture.

5 g. of the pure n-propyl ester of 2-4'-(1'-ethyl-4'-carboxypiperidyl)-5-methylthiophene is dissolved in 50 ml. of dry ether and the solution treated with an excess of benzoic acid dissolved in dry ether. The white benzoate salt which separates is removed by filtration, washed with ether and dried.

*Example 9.—n-Propyl ester of 2-4'-(1'-ethyl-3,5-dimethyl-4'-carboxypiperidyl)-4-methyl-5-isopropylthiophene*

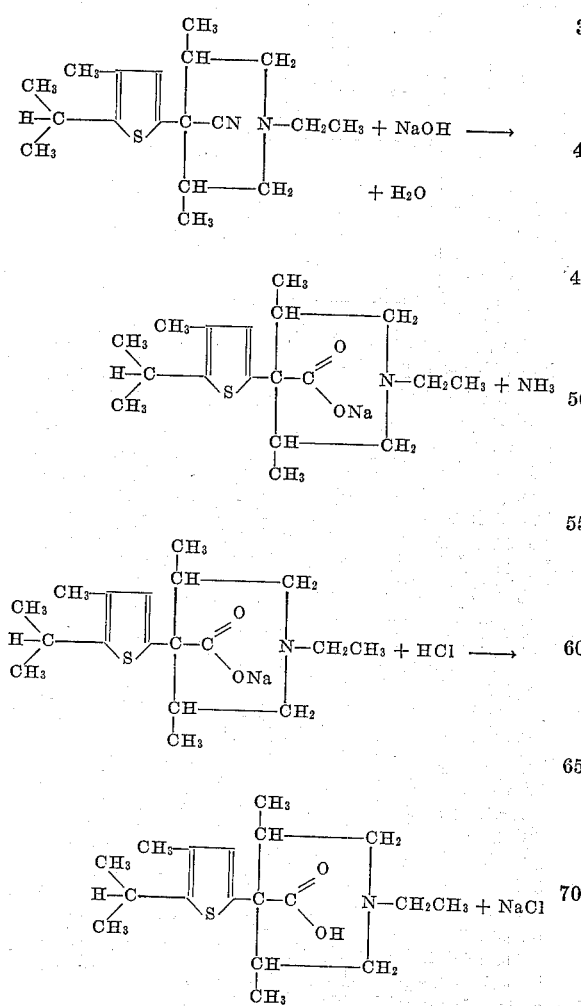

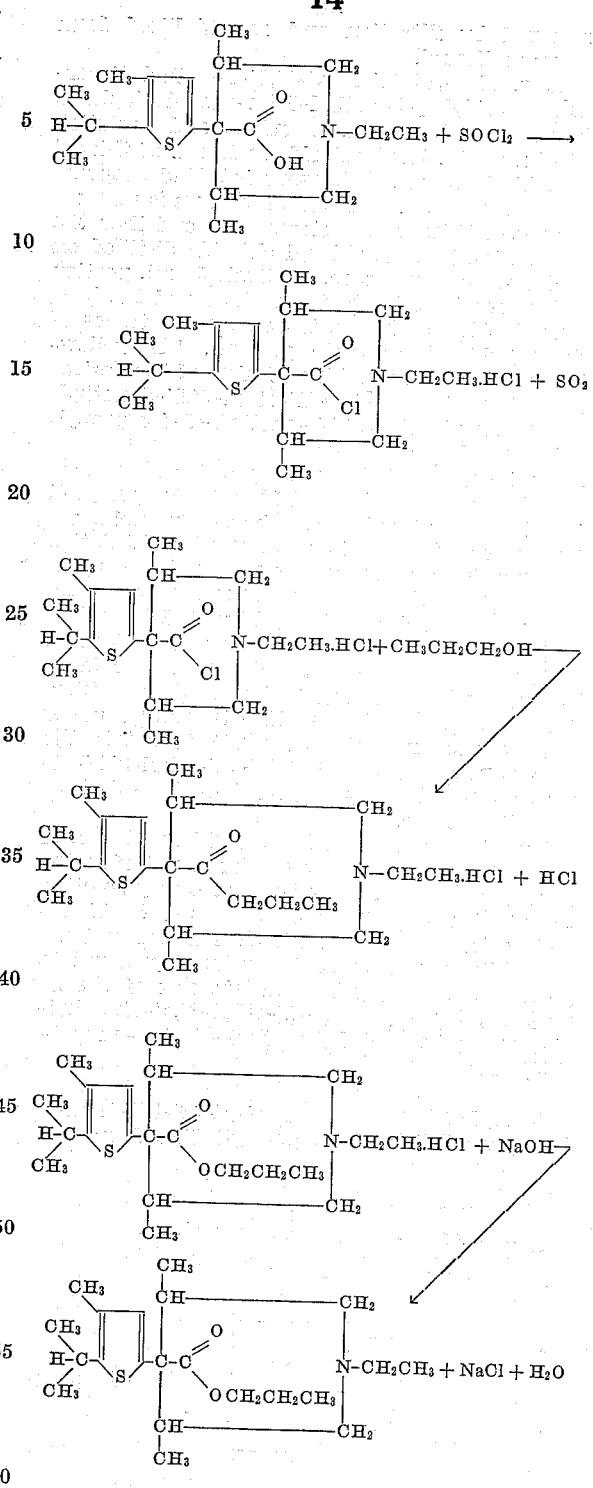

A mixture consisting of 22.6 g. (0.075 mole) of 2-[4'-1'-ethyl-3',5'-dimethyl-4'-cyanopiperidyl)]-4-methyl-5-isopropylthiophene, (prepared, for example, as described in Example 5 of my copending application, Serial No. 609,334, filed August 6, 1945), 15 g. (0.375 mole) of sodium hydroxide and 175 ml. of water is refluxed for twenty-four hours, cooled and the mixture extracted with 50 ml. of ether. The ether extract is discarded and the aqueous solution treated with 6 N hydrochloric acid until precipitation of the white product is just complete. The crude 2-[4'-(1'-ethyl-3,5-dimethyl-4'-carboxypiperidyl)]-4-methyl-5-iso-propylthiophene is removed by filtration and recrystallized from dilute methanol.

20 g. of 2-[4'-(1'-ethyl-3',5'-dimethyl-4'-carboxypiperidyl)]-4-methyl-5-iso-propylthiophene is suspended in 100 ml. of benzene and a solution of 25 ml. of thionyl chloride in 25 ml. of thionyl chloride in 25 ml. of benzene is added dropwise to the mixture. The reaction mixture is refluxed for one-half hour on a steam bath and then the benzene and excess thionyl chloride distilled off under reduced pressure. A fresh 50 ml. portion of benzene is added to the residue and the benzene distilled as before to remove the traces of thionyl chloride from the product. The yellowish-white powdery residue consists of the desired acid chloride of 2-[4'-(1'-ethyl-3',5'-dimethyl-4'-carboxypiperidyl)]-4-methyl-5-iso-propylthiophene hydrochloride.

A mixture consisting of 15 g. of the above acid chloride hydrochloride and 100 ml. of n-propanol is refluxed for two hours. The n-propanol is removed from the reaction mixture by distillation under reduced pressure, the residue taken up in a small amount of water and the resulting solution made alkaline in the cold with 3 N sodium hydroxide solution. The mixture is extracted with ether, the ether extracts dried over magnesium sulfate, filtered and the ether distilled from the filtrate. The residue is distilled under reduced pressure (about 2 mm.) to obtain the pure n-propyl ester of 2-[4'-(1'-ethyl-3',5'-dimethyl-4'-carboxypiperidyl)]-4-methyl-5-iso-propylthiophene.

5 g. of the pure base is dissolved in 100 ml. of distilled water to which a small amount of methanol has been added and the resulting solution trated with exactly one equivalent of 0.5 N sulfuric acid. The solution is then frozen and the ice sublimed under greatly reduced pressure to yield the white powdery sulfate salt of the n-propyl ester of 2-[4'-(1'-ethyl-3',5'-dimethyl-4'-carboxypiperidyl)]-4-methyl-5-iso-propylthiophene.

*Example 10.—Iso-propyl ester of 2-[4'-(1'-n-propyl-4'-carboxypiperidyl)]thiophene*

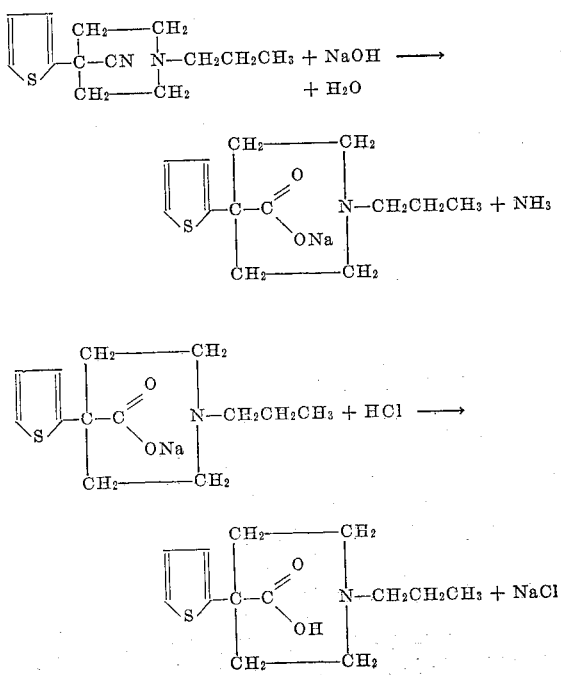

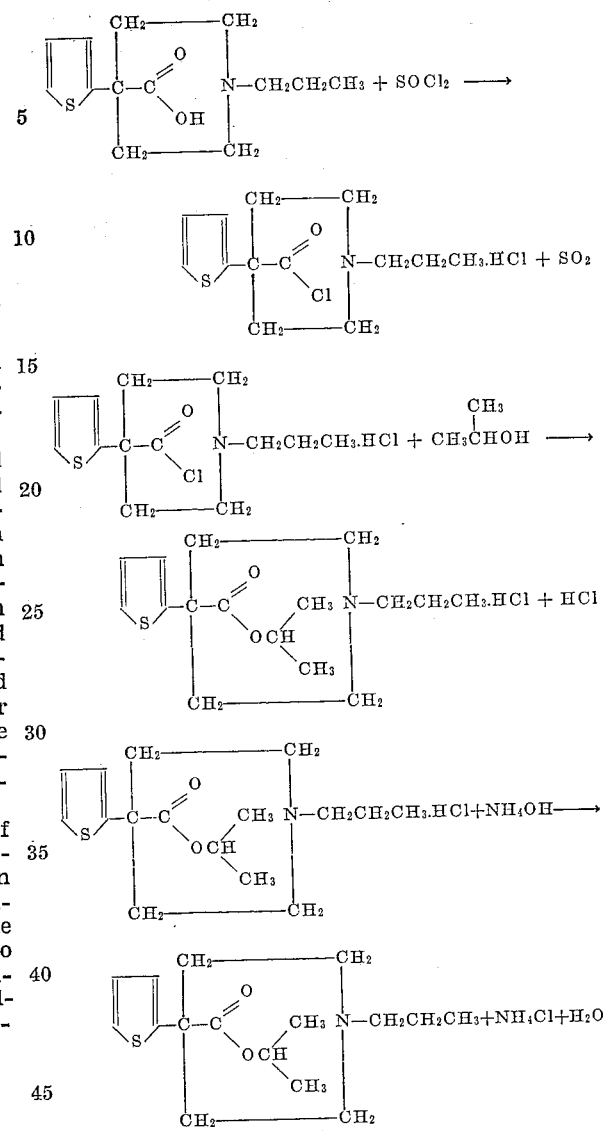

A mixture consisting of 35 g. (0.15 mole) of 2-[4'-(1'-n-propyl-4'-cyanopiperidyl)] thiophene (prepared, for example, as described in Example 7 of my copending application, Serial No. 609,334, filed August 6, 1945), 30 g. (0.75 mole) of sodium hydroxide and 250 ml. of water is refluxed for twenty-four hours, cooled and extracted with 100 ml. of ether. The ether extract is discarded and the aqueous solution treated with 6 N hydrochloric acid until the precipitation of the organic acid is complete. The crude 2-[4'-(1'-n-propyl-4'-carboxypiperidyl)] thiophene is removed by filtration, washed with water and purified by recrystallization from water.

A solution of 50 ml. of thionyl chloride in 50 ml. of benzene is added dropwise to a suspension of 30 g. of 2-[4'-(1'-n-propyl-4'-carboxypiperidyl)]-thiophene in 200 ml. of benzene and the resulting mixture refluxed on a steam bath for one-half hour. The benzene and excess thionyl chloride are distilled off under reduced pressure and 50 ml. of benzene added to the residue. The benzene is distilled under reduced pressure to remove the traces of thionyl chloride remaining in the product. The yellowish-white distillation residue consists of the desired acid chloride of 2-[4'-(1'-n-propyl-4'-carboxypiperidyl)] thiophene hydrochloride.

A mixture consisting of 25 g. of the above acid chloride hydrochloride and 150 ml. of iso-propanol is refluxed for two hours and then the iso-propanol removed by distillation under reduced pressure. The residue is taken up in water, the solution treated with charcoal and filtered. The filtrate is made alkaline in the cold with ammonium hydroxide and extracted with ether. The ether extracts are washed with water, dried over magnesium sulfate and the drying agent removed by filtration. The ether is evaporated from the filtrate and the residue distilled under reduced pressure to obtain the desired iso-propyl ester of 2-[4'-(1'-n-propyl-4-carboxypiperidyl)] thiophene.

*Example 11.—Ethyl ester of 2-[4'-(1'-ethyl-3'-methyl-4'-carboxypiperidyl)]-5-n-butylthiophene*

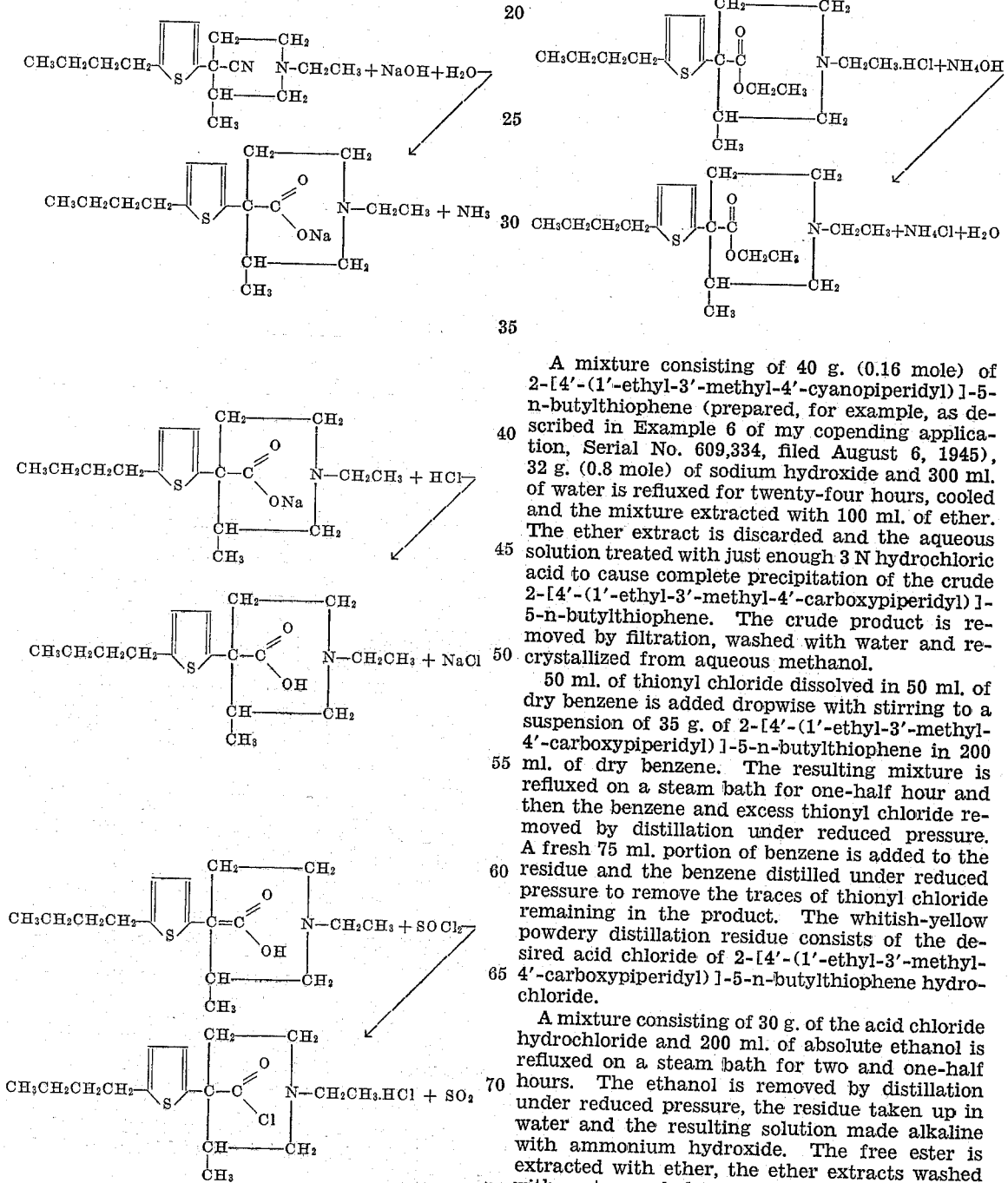

A mixture consisting of 40 g. (0.16 mole) of 2-[4'-(1'-ethyl-3'-methyl-4'-cyanopiperidyl)]-5-n-butylthiophene (prepared, for example, as described in Example 6 of my copending application, Serial No. 609,334, filed August 6, 1945), 32 g. (0.8 mole) of sodium hydroxide and 300 ml. of water is refluxed for twenty-four hours, cooled and the mixture extracted with 100 ml. of ether. The ether extract is discarded and the aqueous solution treated with just enough 3 N hydrochloric acid to cause complete precipitation of the crude 2-[4'-(1'-ethyl-3'-methyl-4'-carboxypiperidyl)]-5-n-butylthiophene. The crude product is removed by filtration, washed with water and recrystallized from aqueous methanol.

50 ml. of thionyl chloride dissolved in 50 ml. of dry benzene is added dropwise with stirring to a suspension of 35 g. of 2-[4'-(1'-ethyl-3'-methyl-4'-carboxypiperidyl)]-5-n-butylthiophene in 200 ml. of dry benzene. The resulting mixture is refluxed on a steam bath for one-half hour and then the benzene and excess thionyl chloride removed by distillation under reduced pressure. A fresh 75 ml. portion of benzene is added to the residue and the benzene distilled under reduced pressure to remove the traces of thionyl chloride remaining in the product. The whitish-yellow powdery distillation residue consists of the desired acid chloride of 2-[4'-(1'-ethyl-3'-methyl-4'-carboxypiperidyl)]-5-n-butylthiophene hydrochloride.

A mixture consisting of 30 g. of the acid chloride hydrochloride and 200 ml. of absolute ethanol is refluxed on a steam bath for two and one-half hours. The ethanol is removed by distillation under reduced pressure, the residue taken up in water and the resulting solution made alkaline with ammonium hydroxide. The free ester is extracted with ether, the ether extracts washed with water and dried over magnesium sulfate.

The drying agent is removed by filtration and the ether distilled. The residue consists of almost pure ethyl ester of 2-[4'-(1'-ethyl-3'-methyl-4'-carboxypiperidyl)]-5-n-butylthiophene.

15 g. of the ethyl ester obtained above is dissolved in anhydrous ether and the solution treated with a slight excess of dry hydrogen chloride. The white hydrochloride salt which separates is collected, washed with ether and recrystallized from absolute ethanol-ether mixture.

*Example 12.—n-Butyl ester of 2-[4'-(1'-n-propyl-2',3',5',6'-tetramethyl - 4' - carboxypiperidyl)-4-methyl-5-chlorothiophene*

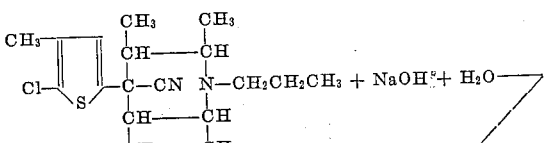

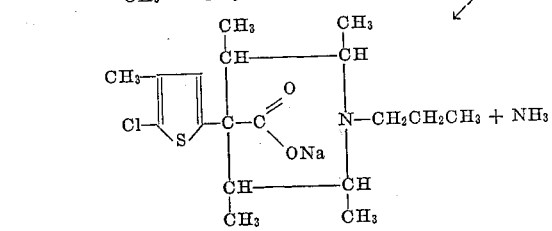

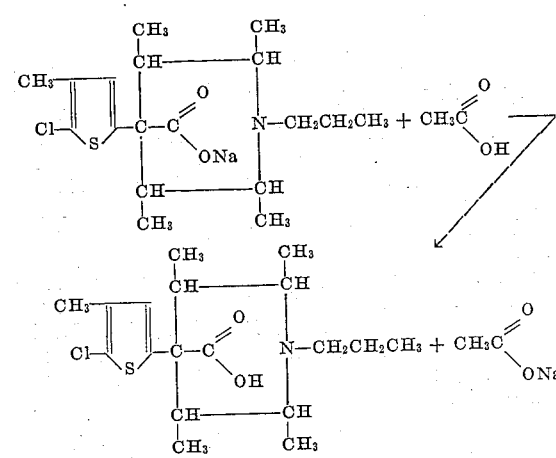

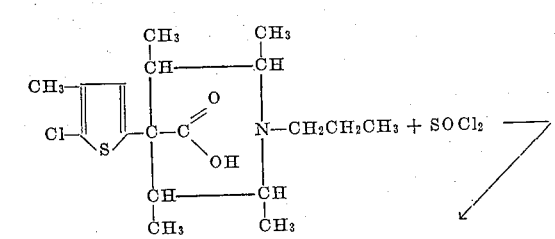

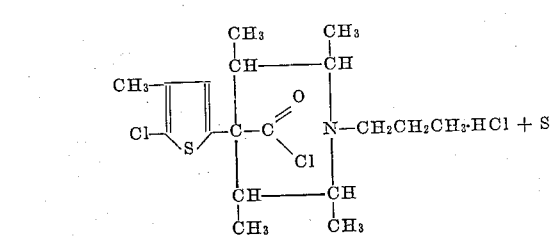

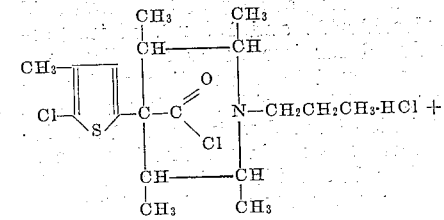

$CH_3CH_2CH_2CH_2OH \longrightarrow$

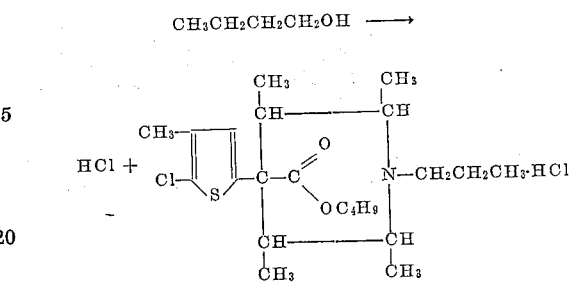

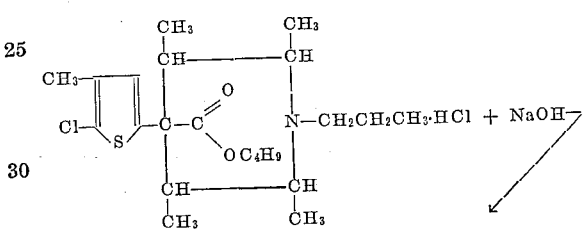

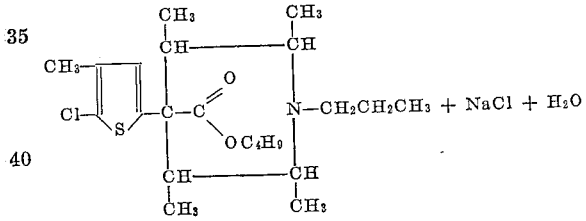

A mixture consisting of 16.7 g. (0.05 mole) of 2 - [4' - (1'-n-propyl-2',3',5',6'-tetramethyl-4'-cyanopiperidyl)]-4-methyl - 5 - chlorothiophene (prepared, for example, as described in Example 8 of my copending application Serial No. 609,334, filed August 6, 1945), 8 g. (0.2 mole) of sodium hydroxide and 100 ml. of water is refluxed for twenty-four hours, cooled and extracted with about 75 ml. of ether. The ether extract is discarded and the aqueous solution treated with just enough acetic acid to cause precipitation of the desired thiophene amino acid. The crude white product is removed by filtration, washed with water and recrystallized from dilute methanol to yield the desired 2-[4'-(1'-n-propyl-2',3',5',6'-tetramethyl-4'-carboxypiperidyl)] - 4-methyl-5-chlorothiophene.

A solution of 25 ml. of thionyl chloride in 25 ml. of dry benzene is added to a rapidly stirred mixture of 15 g. of 2-[4'-(1'-n-propyl-2',3',5',6',-tetramethyl-4'-carboxypiperidyl)]-4-methyl - 5-chlorothiophene in 100 ml. of dry benzene. After the addition has been completed the reaction mixture is refluxed on a steam bath for about forty-five minutes. The benzene and excess thionyl chloride are removed by distillation in vacuo, 50 ml. of benzene added to the residue and the process repeated. The light colored distillation residue is the desired acid chloride of 2-[4'-(1'-n-propyl - 2',3',5',6'-tetramethyl-4'-carboxypiperidyl)]-4-methyl-5-chlorothiophene hydrochloride.

A mixture consisting of 15 g. of the acid chloride hydrochloride and 50 ml. of n-butyl alcohol is heated for about two and one-half hours on a steam bath, the mixture filtered and the n-butanol distilled from the filtrate under reduced pressure. The residue is covered with dry ether and rubbed with a stirring rod which causes it to crystallize. The n-butyl ester of 2-[4'-(1'-n-propyl - 2',3',5',6' - tetramethyl - 4' - carboxypiperidyl)]-4-methyl-5-chlorothiophene hydrochloride is collected, washed with dry ether and recrystallized from absolute ethanol-dry ether mixture.

10 g. of the n-butyl ester of 2-[4'-(1'-n-propyl - 2',3',5',5',- tetramethyl-4'-carboxypiperidyl)]-4-methyl - 5 - chlorothiophene hydrochloride is dissolved in a small amount of water and the solution made alkaline in the cold with 5 N sodium hydroxide solution. The free base of the ester is extracted with ether. The ether extracts treated with charcoal, filtered and dried over magnesium sulfate. The drying agent is removed by filtration and the ether distilled from the filtrate to obtain the free base of the ester.

The hydrobromide salt is prepared by treating the above dried ether solution of the free base with dry hydrogen bromide. The precipitated salt is collected, washed with ether and recrystallized from absolute ethanol-dry ether mixture.

*Example 13.—Sec. butyl ester of 2-[4'-(1'-isopropyl - 3',5'- diethyl-4'-carboxypiperidyl)]-5-t-butylthiophene*

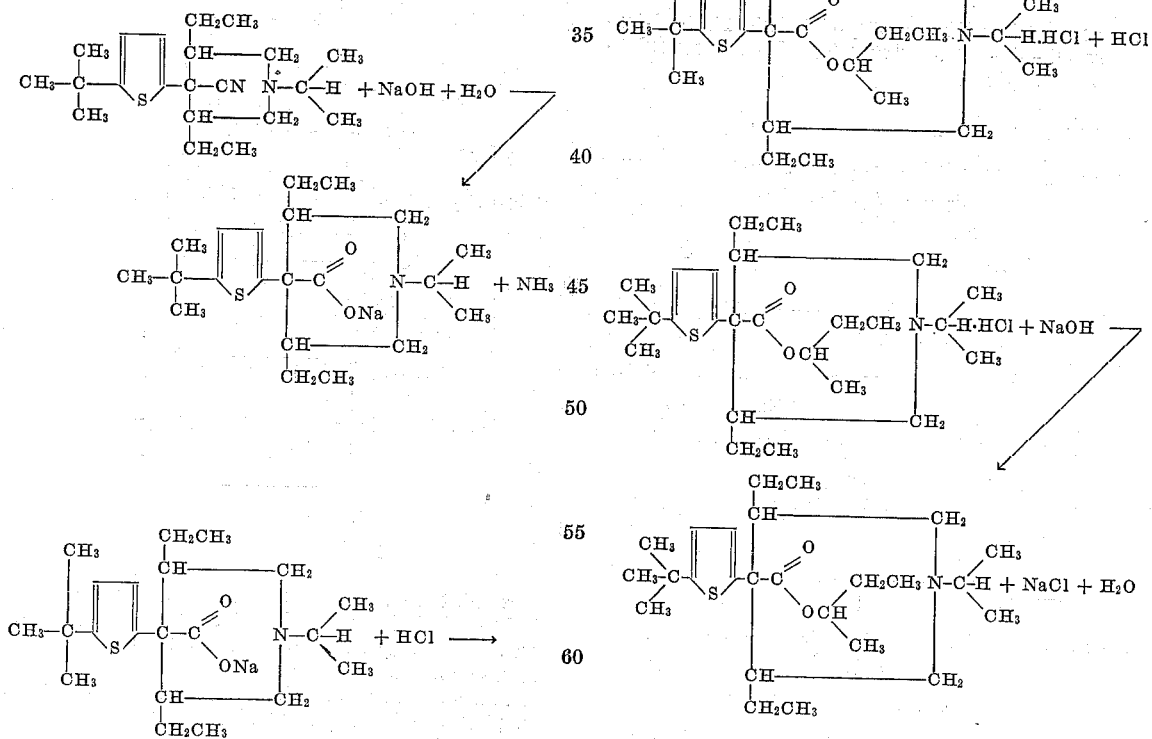

A mixture consisting of 25 g. of 2-[4'-(1'-isopropyl - 3',5' - diethyl - 4' - cyanopiperidyl)]-5-t-butylthiophene (prepared, for example, as described in Example 9 of my copending application, Serial No. 609,334, filed August 6, 1945), 15 g. of sodium hydroxide and 175 ml. of water is refluxed for twenty-four hours, cooled and the clear reaction mixture extracted with 75 ml. of ether. The ether extract is discarded and the aqueous solution treated with just enough 6 N hydrochloric acid to completely precipitate the desired acid. The white product is removed by filtration, washed with water and recrystallized from dilute alcohol.

A solution of 50 ml. of pure thionyl chloride in 50 ml. of dry benzene is added dropwise to a mixture consisting of 30 g. of 2-[4'-(1'-iso-propyl-3',5',-diethyl-4'-carboxypiperidyl)]-5-t-butylthiophene in 200 ml. of dry benzene. After the thionyl chloride has all been added the mixture is refluxed on a steam bath for about forty-five minutes and then the benzene and excess thionyl chloride removed by distillation in vacuo. A fresh 75 ml. portion of benzene is added to the residue and distilled as before to remove the traces of thionyl chloride present in the product. The light colored distillation residue is the acid chloride hydrochloride of 2-[4'-(1'-iso-propyl-3',5'-diethyl-4'-carboxypiperidyl)]-5-t-butylthiophene.

A mixture consisting of 25 g. of the above acid chloride hydrochloride and 150 ml. of sec butyl alcohol (butanol-2) is heated on a steam bath for about three hours, filtered and the butanol removed from the filtrate by distillation in vacuo. The residue is taken up in water, the solution treated with charcoal, filtered and the filtrate made alkaline in the cold with 5 N sodium hydroxide solution. The mixture is extracted with ether, the ether extracts treated with charcoal, filtered and dried over magnesium sulfate. The drying agent is removed by filtration and the ether distilled to yield the desired sec-butyl ester of 2-[4'-(1'-iso-propyl-3',5'-diethyl-4'-carboxypiperidyl)]-5-t-butylthiophene.

*Example 14.—Ethyl ester of 2-[4'-(1',3'-di-iso-propyl-4'-carboxypiperidyl)]-4-methyl-5-ethylthiophene*

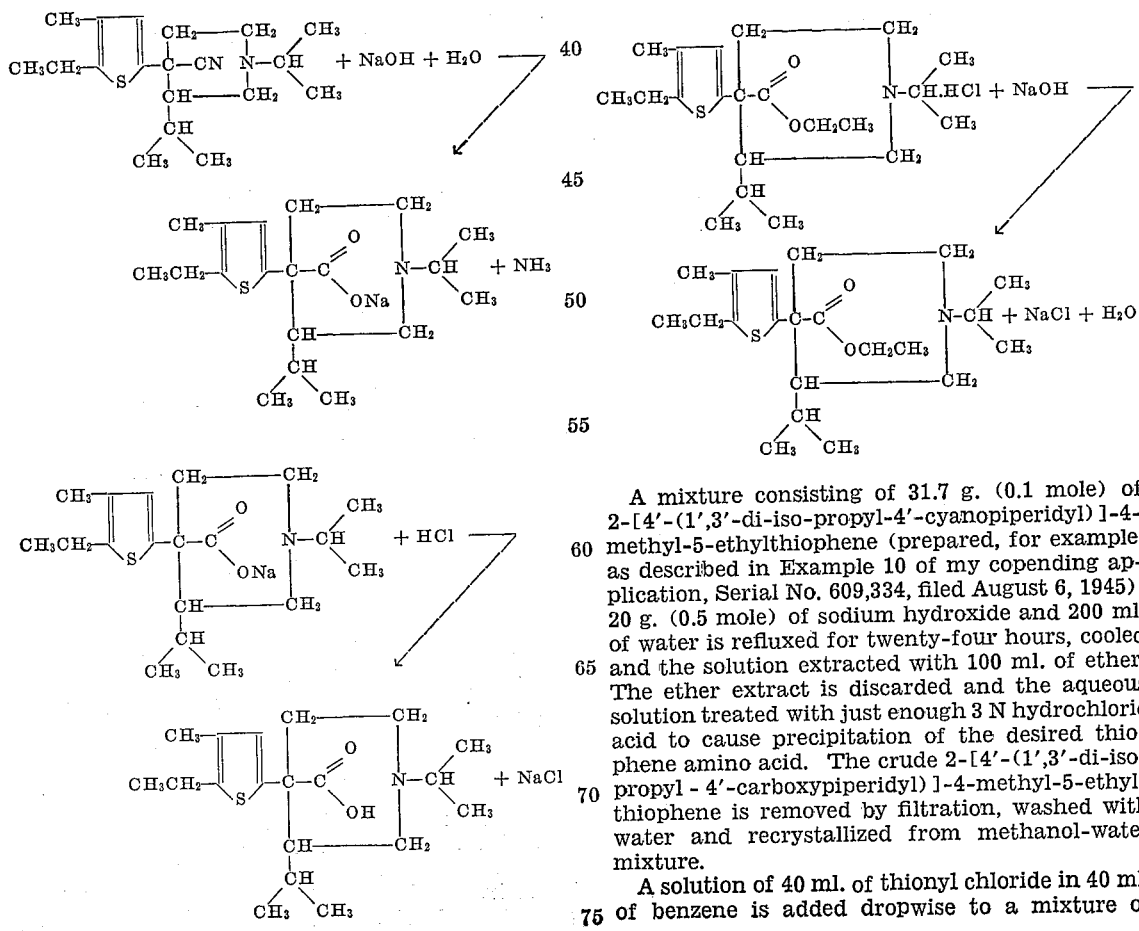

A mixture consisting of 31.7 g. (0.1 mole) of 2-[4'-(1',3'-di-iso-propyl-4'-cyanopiperidyl)]-4-methyl-5-ethylthiophene (prepared, for example, as described in Example 10 of my copending application, Serial No. 609,334, filed August 6, 1945), 20 g. (0.5 mole) of sodium hydroxide and 200 ml. of water is refluxed for twenty-four hours, cooled and the solution extracted with 100 ml. of ether. The ether extract is discarded and the aqueous solution treated with just enough 3 N hydrochloric acid to cause precipitation of the desired thiophene amino acid. The crude 2-[4'-(1',3'-di-iso-propyl-4'-carboxypiperidyl)]-4-methyl-5-ethylthiophene is removed by filtration, washed with water and recrystallized from methanol-water mixture.

A solution of 40 ml. of thionyl chloride in 40 ml. of benzene is added dropwise to a mixture of 30 g. of 2-[4'-(1',3'-di-iso-propyl-4'-carboxypiperidyl)]-4-methyl-5-ethylthiophene in 200 ml. of benzene and the resulting mixture refluxed for about forty-five minutes on a steam bath. The excess thionyl chloride and the benzene are removed by distillation in vacuo and the residue treated with a fresh 75 ml. portion of benzene. The benzene is distilled in vacuo as before to remove the traces of thionyl chloride, remaining in the product. The distillation residue is the desired acid chloride hydrochloride of 2-[4'-(1',3'-di-iso-propyl-4'-carboxypiperidyl)]-4-methyl-5-ethylthiophene.

A mixture consisting of 25 g. of the above acid chloride hydrochloride and 200 ml. of absolute ethanol is refluxed on a steam bath for two hours, the hot solution filtered and the alcohol removed from the filtrate by distillation in vacuo. The residue is taken up in a small amount of water and the solution made alkaline in the cold with 5 N sodium hydroxide solution. The free base of the ester is extracted with ether, the ether extracts dried and the ether distilled to yield the ethyl ester of 2-[4'-(1',3'-di-iso-propyl-4'-carboxypiperidyl)]-4-methyl-5-ethylthiophene.

The hydrochloride salt of the ester is obtained as a white powder by treatment of an anhydrous ether solution of the base with dry hydrogen chloride. This salt may be purified by crystallization from absolute ethanol-dry ether mixture.

*Example 15.—n-Propylester of 2-4'-(1'-n-butyl-4'-carboxypiperidyl)thiophene*

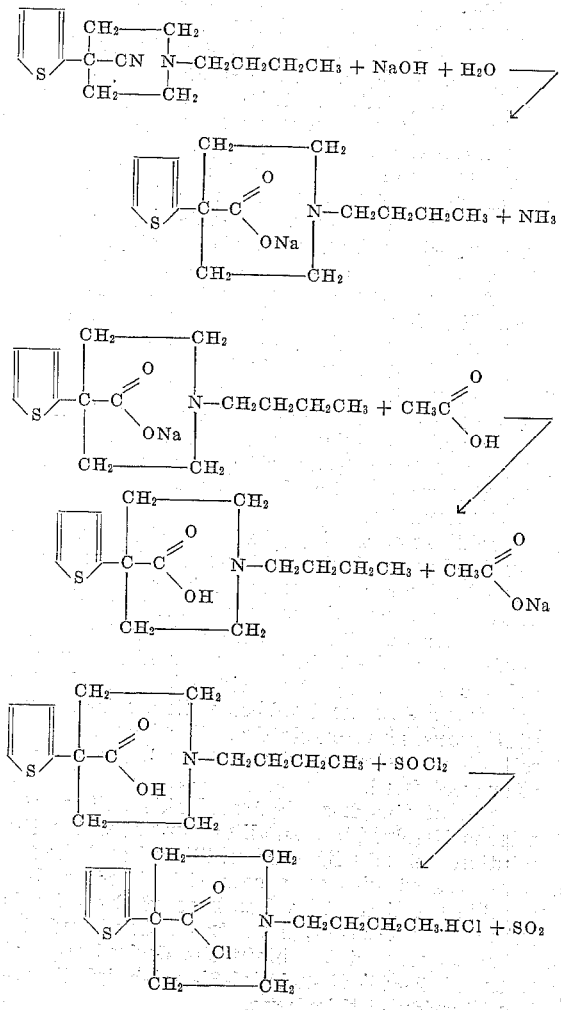

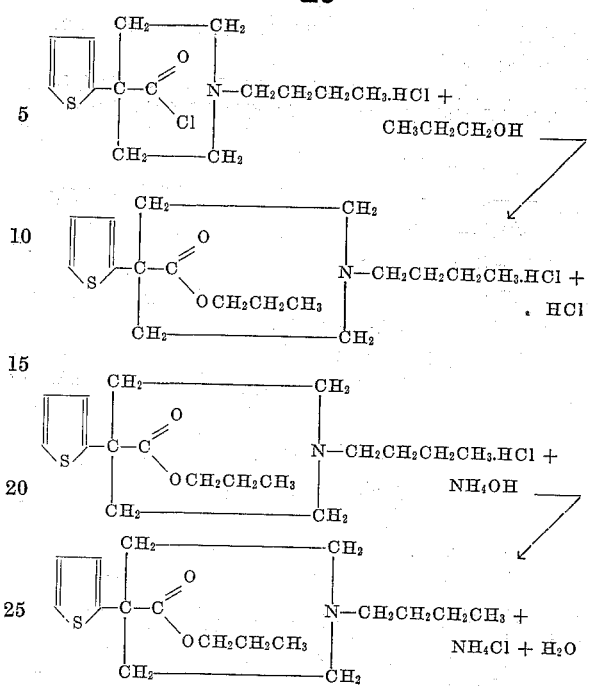

A mixture consisting of 37.2 g. (0.15 mole) of 2-[4'-(1'-n-butyl-4'-cyanopiperidyl)]thiophene (prepared, for example, as described in Example 11 of my copending application, Serial No. 609,334, filed August 6, 1945), 30 g. (0.75 mole) of sodium hydroxide and 250 ml. of water is refluxed for twenty-four hours, cooled and the solution extracted with 75 ml. of ether. The ether extract is discarded and the aqueous solution treated with just enough acetic acid to precipitate all of the crude white 2-[4'-(1'-n-butyl-4'-carboxypiperidyl)]thiophene. The crude product is collected, washed with water and recrystallized from dilute methanol.

A mixture consisting of 26.7 g. (0.1 mole) of 2-[4'-(1'-n-butyl-4'-carboxypiperidyl)]thiophene in 100 ml. of dry benzene is stirred rapidly while a solution of 50 ml. of thionyl chloride in 50 ml. of dry benzene is added dropwise. The resulting mixture is refluxed on a steam cone for about one hour and then the benzene and excess thionyl chloride removed by distillation in vacuo. A fresh 50 ml. portion of benzene is added to the residue and the benzene distilled as before to remove the traces of thionyl chloride remaining in the product. The light colored distillation residue consists of the desired acid chloride hydrochloride of 2[4'-(1'-n-butyl-4'-carboxypiperidyl)]thiophene.

A mixture consisting of 25 g. of the above acid chloride hydrochloride and 200 ml. of n-propanol is refluxed for two hours, the hot solution filtered and the n-propanol distilled from the filtrate under reduced pressure. The residue is stirred with dry ether which causes it to crystallize. The hydrochloride salt of the ester is collected, washed with ether and recrystallized from absolute ethanol ether mixture.

The purified ester hydrochloride is dissolved in a small amount of water and the resulting solution made alkaline in the cold with ammonium hydroxide. The mixture is extracted with ether, the ether extracts washed with water and dried over magnesium sulfate. The drying agent is removed by filtration and the ether distilled. The residue consists of the desired n-propyl ester of 2-[4'-(1'-n-butyl-4'-carboxypiperidyl)]thiophene which may be purified further, if desired,

*Example 16.—n-Amyl ester of 2-[4'-(1'-n-butyl-3'-tert-butyl-4'-carboxypiperidyl)] thiophene*

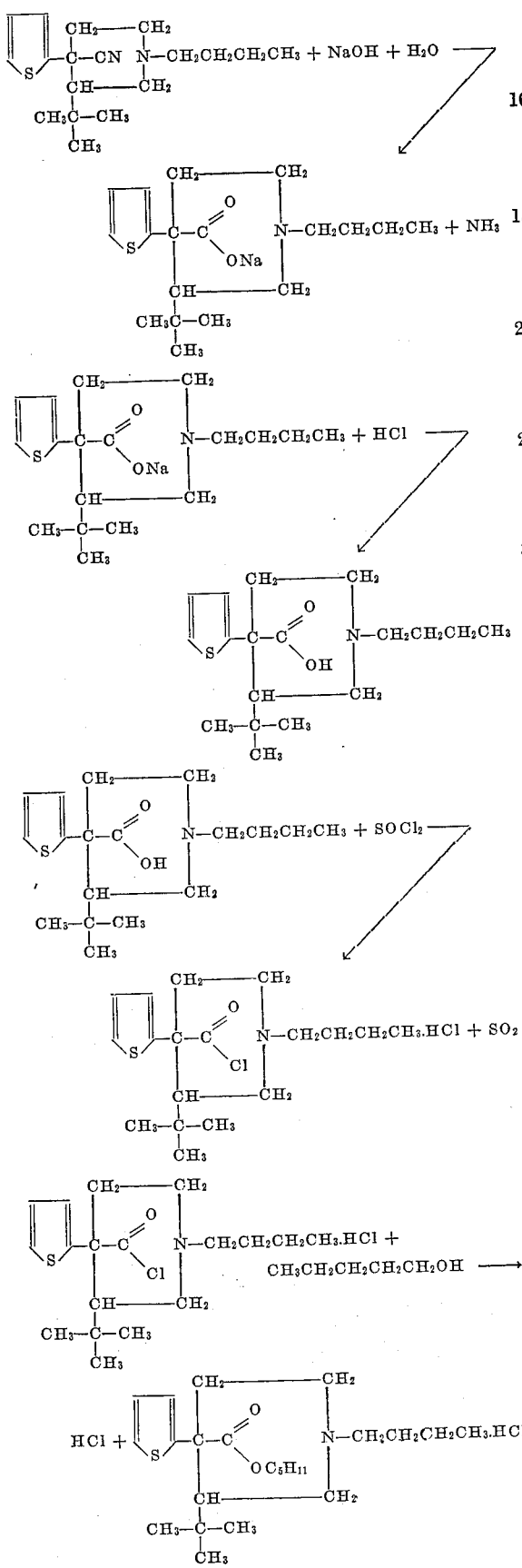
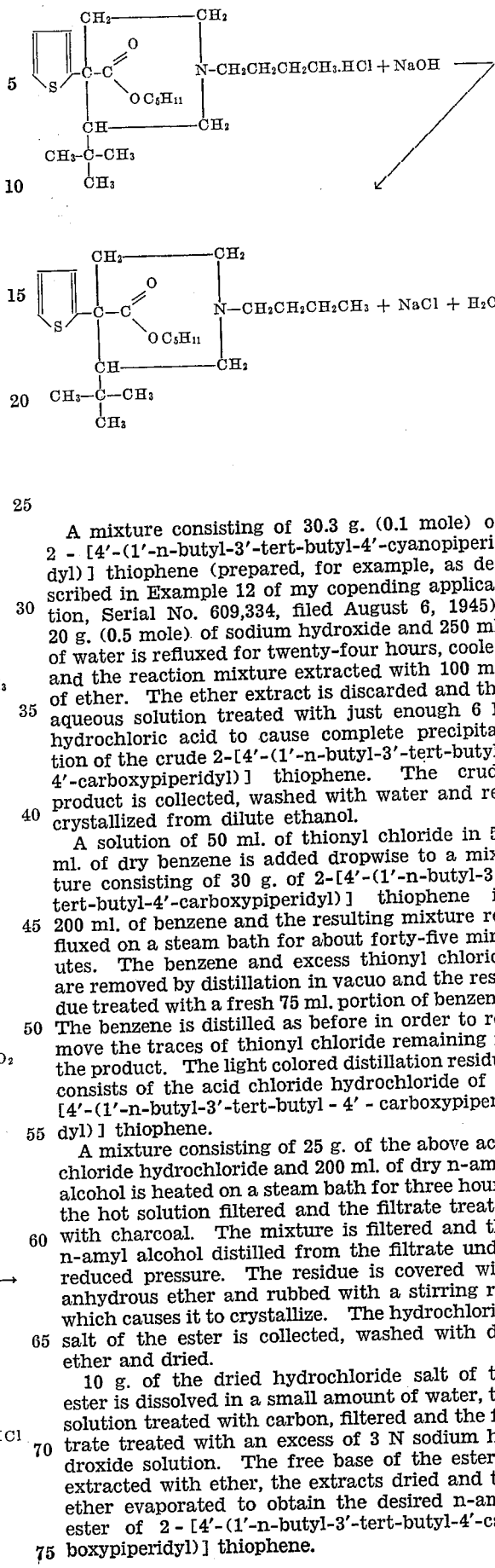

A mixture consisting of 30.3 g. (0.1 mole) of 2 - [4'-(1'-n-butyl-3'-tert-butyl-4'-cyanopiperidyl)] thiophene (prepared, for example, as described in Example 12 of my copending application, Serial No. 609,334, filed August 6, 1945), 20 g. (0.5 mole) of sodium hydroxide and 250 ml. of water is refluxed for twenty-four hours, cooled and the reaction mixture extracted with 100 ml. of ether. The ether extract is discarded and the aqueous solution treated with just enough 6 N hydrochloric acid to cause complete precipitation of the crude 2-[4'-(1'-n-butyl-3'-tert-butyl-4'-carboxypiperidyl)] thiophene. The crude product is collected, washed with water and recrystallized from dilute ethanol.

A solution of 50 ml. of thionyl chloride in 50 ml. of dry benzene is added dropwise to a mixture consisting of 30 g. of 2-[4'-(1'-n-butyl-3'-tert-butyl-4'-carboxypiperidyl)] thiophene in 200 ml. of benzene and the resulting mixture refluxed on a steam bath for about forty-five minutes. The benzene and excess thionyl chloride are removed by distillation in vacuo and the residue treated with a fresh 75 ml. portion of benzene. The benzene is distilled as before in order to remove the traces of thionyl chloride remaining in the product. The light colored distillation residue consists of the acid chloride hydrochloride of 2-[4'-(1'-n-butyl-3'-tert-butyl - 4' - carboxypiperidyl)] thiophene.

A mixture consisting of 25 g. of the above acid chloride hydrochloride and 200 ml. of dry n-amyl alcohol is heated on a steam bath for three hours, the hot solution filtered and the filtrate treated with charcoal. The mixture is filtered and the n-amyl alcohol distilled from the filtrate under reduced pressure. The residue is covered with anhydrous ether and rubbed with a stirring rod which causes it to crystallize. The hydrochloride salt of the ester is collected, washed with dry ether and dried.

10 g. of the dried hydrochloride salt of the ester is dissolved in a small amount of water, the solution treated with carbon, filtered and the filtrate treated with an excess of 3 N sodium hydroxide solution. The free base of the ester is extracted with ether, the extracts dried and the ether evaporated to obtain the desired n-amyl ester of 2 - [4'-(1'-n-butyl-3'-tert-butyl-4'-carboxypiperidyl)] thiophene.

*Example 17.—Benzyl ester of 2-[4'-(1'-methyl-4'-carboxypiperidyl)]thiophene*

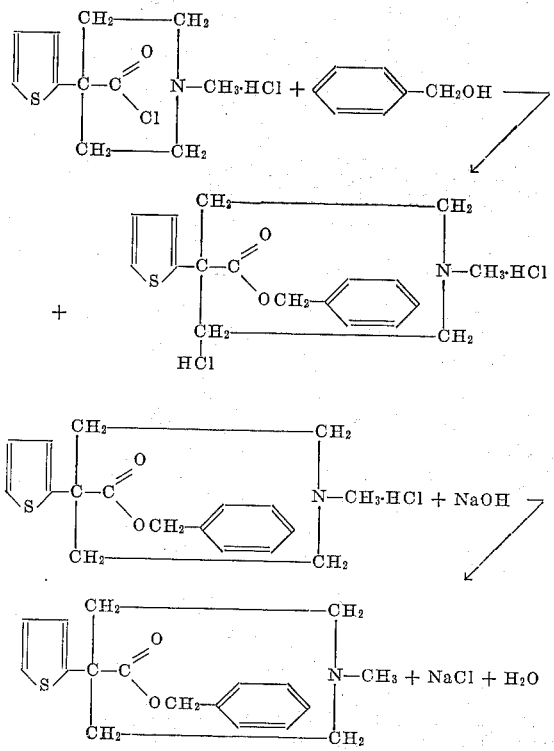

A mixture consisting of 15 g. of the acid chloride hydrochloride of 2-[4'-(1'-methyl-4'-carboxypiperidyl)] thiophene and 65 ml. of benzyl alcohol is heated on a steam bath for three hours, the hot solution filtered and the benzyl alcohol distilled from the filtrate under reduced pressure. The residue is taken up in a small amount of water and the solution treated with a slight excess of cold 3 N sodium hydroxide solution. The free base of the ester is extracted with ether and the combined ether extracts dried over anhydrous sodium sulfate. The drying agent is removed by filtration and the ether distilled from the filtrate. The residue is the desired benzyl ester of 2-[4'-(1'-methyl-4'-carboxypiperidyl)] thiophene.

10 g. of the free base of the ester is dissolved in 200 ml. of anhydrous ether and the resulting solution treated with a slight excess of dry hydrogen chloride. The white hydrochloride salt which separates is collected and purified by recrystallization from absolute ethanol-dry ether mixture.

*Example 18.—β-Phenylethyl ester of 2-[4'-(1'-ethyl-4'-carboxypiperidyl)]-5-methylthiophene*

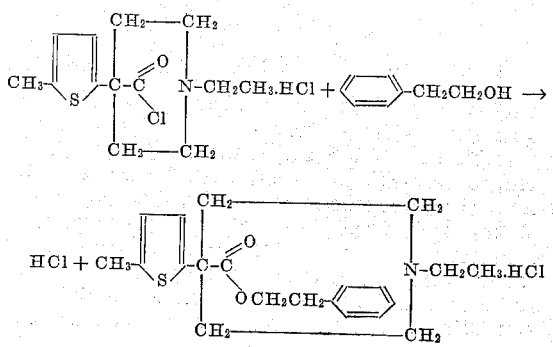

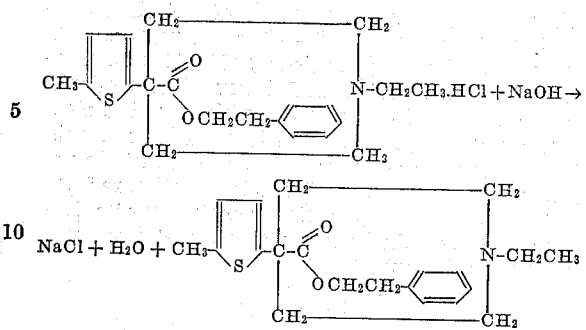

A mixture consisting of 15 g. of the acid chloride hydrochloride of 2-[4'-(1'-ethyl-4'-carboxypiperidyl)]-5-methylthiophene and 50 ml. of β-phenylethyl alcohol is heated on a steam bath for four hours. The mixture is cooled and diluted with 500 ml. of ether. The ether solution is decanted from the gummy precipitate and the precipitate washed with several fresh portions of dry ether. The precipitate which consists of the hydrochloride of the desired ester is dissolved in water, the solution treated with charcoal, filtered and the filtrate treated with a slight excess of cold 3 N sodium hydroxide solution. The free base of the ester is extracted with ether, the extract dried over magnesium sulfate, filtered and the filtrate evaporated to obtain the β-phenylethyl ester of 2-[4'-(1'-ethyl-4'-carboxypiperidyl)]-5-methylthiophene.

5 g. of the free base of the ester is dissolved in 150 ml. of dry ether and the resulting solution treated with a slight excess of dry hydrogen bromide. The white precipitated hydrobromide salt is removed by filtration, washed with dry ether and recrystallized from absolute ethanol-dry ether mixture.

What I claim as my invention is:

1. Compounds of the class consisting of a free base and its acid addition salts, said free base having the formula,

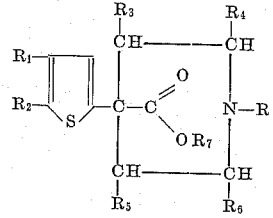

where $R_1$ represents a member of the class consisting of hydrogen and —$CH_3$, $R_2$ represents a member of the class consisting of hydrogen, chlorine, bromine, iodine and lower alkyl radicals, $R_3$, $R_4$, $R_5$ and $R_6$ represent members of the class consisting of hydrogen and lower alkyl radicals, $R_7$ represents a member of the class consisting of hydrogen, lower alkyl and phenyl substituted lower alkyl radicals and R represents a member of the class consisting of hydrogen and lower alkyl radicals.

2. Compounds of the class consisting of a free base and its acid addition salts, said free base having the formula,

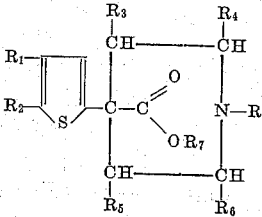

when $R_1$ represents a member of the class consisting of hydrogen and —$CH_3$, $R_2$ represents a member of the class consisting of hydrogen, chlorine, bromine, iodine and lower alkyl radicals, $R_3$, $R_4$, $R_5$ and $R_6$ represent members of the class consisting of hydrogen and lower alkyl radicals, $R_7$ represents a member of the class consisting of lower alkyl radicals and R is a lower alkyl radical.

3. Compounds of the class consisting of a free base and its acid addition salts, said free base having the formula,

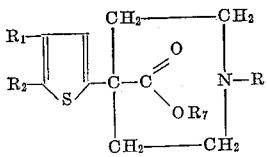

where $R_1$ represents a member of the class consisting of hydrogen and —$CH_3$, $R_2$ is a member of the class consisting of hydrogen, chlorine, bromine, iodine and lower alkyl radicals, $R_7$ represents a member of the class consisting of lower alkyl radicals and R is a lower alkyl radical.

4. Compounds of the class consisting of a free base and its acid addition salts, said free base having the formula,

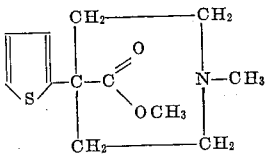

5. Compounds of the class consisting of a free base and its acid addition salts, said free base having the formula,

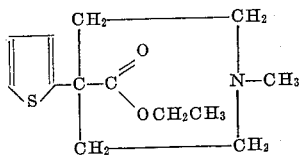

6. Compounds of the class consisting of a free base and its acid addition salts, said free base having the formula,

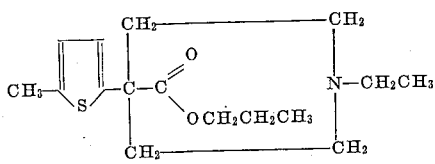

7. A compound of the formula,

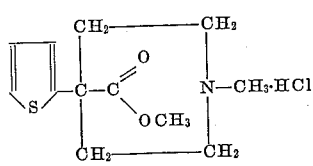

8. A compound of the formula,

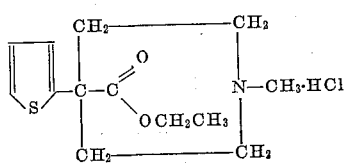

9. A compound of the formula,

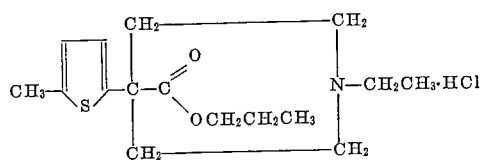

10. Process which comprises hydrolyzing a thiophenic nitrile of the formula,

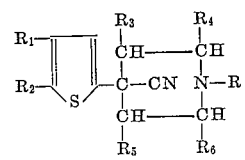

thereby obtaining a carboxylic acid of the formula,

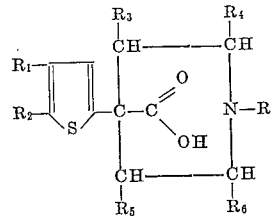

treating said acid with a chlorinating agent capable of converting organic carboxylic acids to the corresponding acyl chlorides thereby obtaining the hydrochloride of an acyl chloride of the formula,

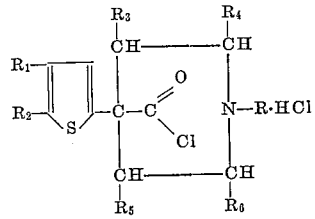

treating said acyl chloride hydrochloride with an alcohol of the formula,

neutralizing the reaction product and isolating the ester so formed, said ester having the formula,

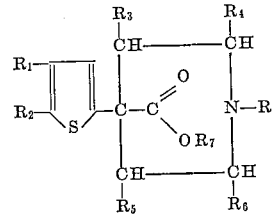

where $R_1$ represents a member of the class consisting of hydrogen and —$CH_3$, $R_2$ represents a member of the class consisting of hydrogen, chlorine, bromine, iodine and lower alkyl radicals, $R_3$, $R_4$, $R_5$ and $R_6$ represent members of the class consisting of hydrogen and lower alkyl radicals, $R_7$ represents a member of the class consisting of lower alkyl and phenyl substituted lower alkyl radicals and R represents a member of the class consisting of hydrogen and lower alkyl radicals.

11. Process which comprises hydrolyzing a thiophenic nitrile of the formula,

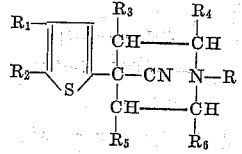

with aqueous alkali thereby obtaining a carboxylic acid of the formula,

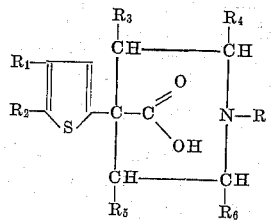

treating said acid with thionyl chloride in a dry inert organic solvent thereby obtaining the hydrochloride of an acyl chloride of the formula,

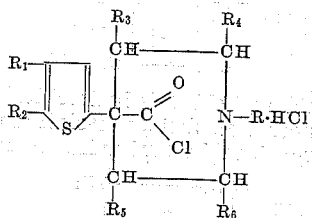

treating said acyl chloride hydrochloride with an excess of an alcohol of the formula, $R_7OH$ and isolating the ester so formed, said ester having the formula,

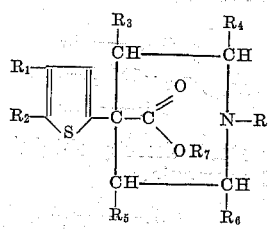

where $R_1$ represents a member of the class consisting of hydrogen and —$CH_3$, $R_2$ represents a member of the class consisting of hydrogen, chlorine, bromine, iodine and lower alkyl radicals, $R_3$, $R_4$, $R_5$ and $R_6$ represent members of the class consisting of hydrogen and lower alkyl radicals, $R_7$ represents a member of the class consisting of lower alkyl and phenyl substituted lower alkyl radicals and R represents a member of the class consisting of hydrogen and lower alkyl radicals.

12. Process which comprises hydrolyzing a thiophenic nitrile of the formula,

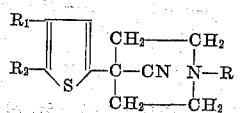

with aqueous alkali thereby obtaining a carboxylic acid of the formula

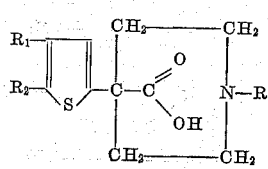

treating said acid with thionyl chloride in a dry inert organic solvent thereby obtaining the hydrochloride of an acyl chloride of the formula,

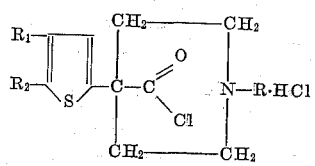

treating said acyl chloride hydrochloride with an excess of an alcohol of the formula, $R_7OH$ neutralizing the reaction product and isolating the ester so formed, said ester having the formula,

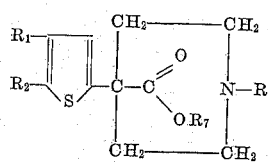

where $R_1$ represents a member of the class consisting of hydrogen and —$CH_3$, $R_2$ represents a member of the class consisting of hydrogen, chlorine, bromine, iodine and lower alkyl radicals, $R_7$ represents a member of the class consisting of lower alkyl radicals and R represents a member of the class consisting of hydrogen and lower alkyl radicals.

13. Process which comprises hydrolyzing a thiophenic nitrile of the formula,

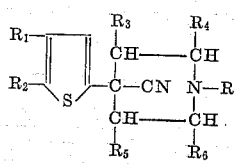

thereby obtaining a carboxylic acid of the formula,

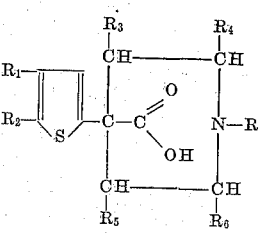

treating said acid with a chlorinating agent capable of converting organic carboxylic acids to the corresponding acyl chlorides thereby obtaining the hydrochloride of an acyl chloride of the formula,

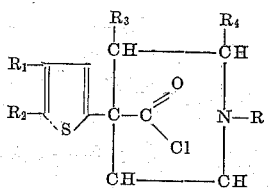

treating said acyl chloride hydrochloride with an alcohol of the formula, $R_7OH$ and isolating an acid addition salt of the ester so formed, the free base of said ester having the formula,

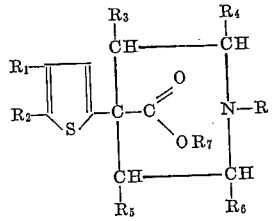

where $R_1$ represents a member of the class consisting of hydrogen and —$CH_3$, $R_2$ represents a member of the class consisting of hydrogen, chlorine, bromine, iodine and lower alkyl radicals, $R_3$, $R_4$, $R_5$ and $R_6$ represent members of the class consisting of hydrogen and lower alkyl radicals, $R_7$ represents a member of the class consisting of lower alkyl and phenyl substituted lower alkyl radicals and R represents a member of the class consisting of hydrogen and lower alkyl radicals.

14. Process which comprises hydrolyzing a thiophenic nitrile of the formula,

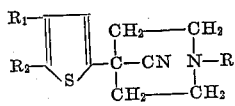

with aqueous alkali thereby obtaining a carboxylic acid of the formula,

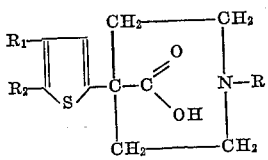

treating said acid with thionyl chloride in a dry inert organic solvent thereby obtaining the hydrochloride of an acyl chloride of the formula,

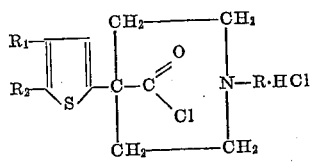

treating said acyl chloride hydrochloride with an excess of an alcohol of the formula,

and isolating the ester so formed as an acid addition salt, the free base of said ester having the formula,

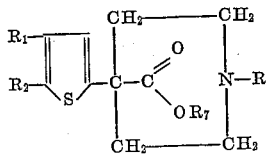

where $R_1$ represents a member of the class consisting of hydrogen and —$CH_3$, $R_2$ represents a member of the class consisting of hydrogen, chlorine, bromine, iodine and lower alkyl radicals, $R_7$ represents a member of the class consisting of lower alkyl radicals and R represents a member of the class consisting of hydrogen and lower alkyl radicals.

15. Process which comprises hydrolyzing a thiophenic nitrile of the formula,

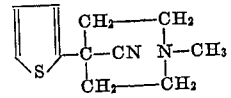

with aqueous alkali thereby obtaining a carboxylic acid of the formula,

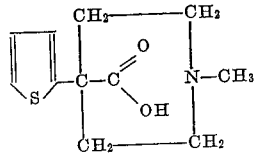

treating said acid with thionyl chloride in a dry inert organic solvent thereby obtaining the hydrochloride of an acyl chloride of the formula,

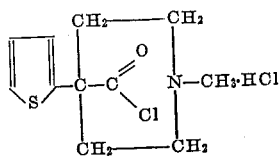

treating said acyl chloride hydrochloride with an excess of methyl alcohol and isolating the methyl ester so formed, said ester having the formula,

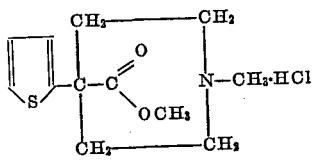

16. Process which comprises hydrolyzing a thiophenic nitrile of the formula,

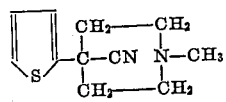

with aqueous alkali thereby obtaining a carboxylic acid of the formula,

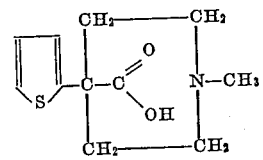

treating said acid with thionyl chloride in a dry inert organic solvent thereby obtaining the hydrochloride of an acyl chloride of the formula,

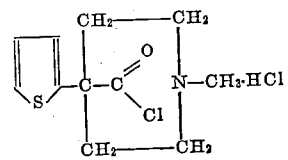

treating said acyl chloride hydrochloride with an excess of ethyl alcohol and isolating the ethyl ester so formed, said ester having the formula,

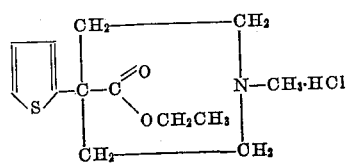

17. Process which comprises hydrolyzing a thiophenic nitrile of the formula,

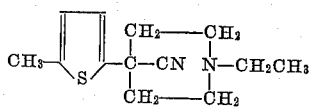

with aqueous alkali thereby obtaining a carboxylic acid of the formula,

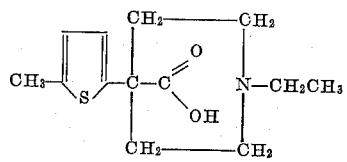

treating said acid with thionyl chloride in a dry inert organic solvent thereby obtaining the hydrochloride of an acyl chloride of the formula,

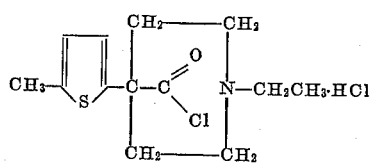

treating said acyl chloride hydrochloride with an excess of *n*-propyl alcohol and isolating the *n*-propyl ester so formed, said ester having the formula,

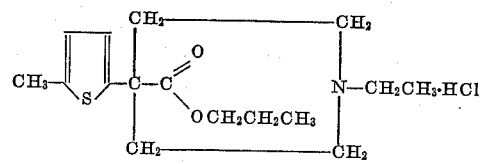

FREDERICK F. BLICKE.